United States Patent [19]

Takai

[11] Patent Number: 5,416,704
[45] Date of Patent: May 16, 1995

[54] CONTROLLER FOR INTERIOR SYSTEM FOR USE IN AUTOMOTIVE VEHICLE

[75] Inventor: Hideo Takai, Kanagawa, Japan

[73] Assignee: Nissan Motor Co., Ltd., Yokohama, Japan

[21] Appl. No.: 940,134

[22] Filed: Sep. 3, 1992

[30] Foreign Application Priority Data

Sep. 12, 1991 [JP] Japan .................................. 3-261144

[51] Int. Cl.6 ............................................. B60R 21/32
[52] U.S. Cl. ................. 364/424.05; 340/436; 307/10.1; 180/282; 280/735
[58] Field of Search ............ 364/424.05; 280/734, 280/735; 180/274, 282; 307/10.1; 340/436, 438, 669

[56] References Cited

U.S. PATENT DOCUMENTS

| 4,641,041 | 2/1987 | Mattes et al. .................... 180/282 |
| 4,968,965 | 11/1990 | Naitou et al. ................... 280/735 |
| 5,068,793 | 11/1991 | Condne et al. .................. 364/424.05 |
| 5,182,459 | 1/1993 | Okano et al. .................... 280/735 |
| 5,208,484 | 5/1993 | Okano et al. .................... 340/436 |

FOREIGN PATENT DOCUMENTS 63-503531 12/1988 Japan .

OTHER PUBLICATIONS

"Manual of NISSAN new Model Cars No. Y32-1", pp. D-112.

*Primary Examiner*—Gary Chin
*Attorney, Agent, or Firm*—Lowe, Price, LeBlanc & Becker

[57] ABSTRACT

A controller for an interior system for use in an automotive vehicle comprises an operation confirmation part and an operation inhibiting signal generation part which inhibits subsequent drive of an output part after completion of actuation of an interior system operation part when acceleration applied to the vehicle is greater than a second predetermined value (>first predetermined value).

6 Claims, 4 Drawing Sheets

CONTROLLER FOR INTERIOR SYSTEM FOR USE IN AUTOMOTIVE VEHICLE

BACKGROUND OF THE INVENTION

The present invention relates to a controller for an interior system for use in an automotive vehicle.

A controller for an interior system for use in an automotive vehicle is now in practical use, which operates an air bag, a seat belt pretensioner, etc. for absorbing an impact when an acceleration sensor detects, upon frontal collision of the automotive vehicle, an impact greater than a predetermined value (see, for example, a Manual of NISSAN New Model Cars No. Y32-1, published in Jun., 1991).

Referring to FIG. 4, there is shown a block diagram illustrating such known interior system controller 1. An electronic acceleration sensor part 11 comprises, for example, a cantilevered piezoelectric element which is deformed when undergoing acceleration in a predetermined direction so as to output to an amplifier filter part 12 a voltage 101 in response to a deformation amount thereof. The amplifier filter part 12 amplifies the input voltage 101 to eliminate a needless frequency, and outputs an acceleration signal 102 to a signal processing part 13. As disclosed, for example, in JP-A 63-503531, the signal processing part 13 comprises a subtracter D, an integrator I, and a threshold value generator S. The subtracter D subtracts a threshold value of the threshold value generator S from the acceleration signal 102, whereas the integrator I integrates the acceleration signal 102 after subtraction processing. That is, the signal processing part 13 integrates the acceleration signal 102 greater than the threshold value to output same to an operation decision part 14. When an integration signal 103 out of the signal processing part 13 becomes a predetermined value, the operation decision part 14 outputs an output indicative signal 104 to an output part 15 so as to operate an operation part 3 for an interior system such as an air bag, a seat belt pretensioner, etc. in a manner similar to, for example, a trigger threshold value switch A as shown in JP-A 63-503531. It is to be noted that this predetermined value of the integration signal 103 corresponds to a first acceleration as a criterion for a first discrimination means.

Referring to FIG. 5, the output part 15 comprises a resistor 15A and a transistor 15B. Normally, the output indicative signal 104 of the operation decision part 14 is in high level, and the transistor 15B is turned off. When the output indicative signal 104 is output from the operation decision part 14 to put a signal line thereof in low level, the transistor 15B is turned on. Referring to FIG. 6, an auxiliary power supply part 16 steps up in a step-up part 16A a supply voltage 106 of a power supply part which is a battery of the vehicle, and charges a condenser 16D via an anti-counterflow diode 16B and a charging current restrainer resistor 16C. When the transistor 15B of the output part 15 is turned on, electric energy charged in the condenser 16D is supplied to the interior system operation part 3 via a power supply line 105, the transistor 15B, and a power supply line 107. The interior system operation part 3 comprises an electric igniter or squib, and a gas generator for generating, for example, nitrogen gas by actuation of the squib to operate the air bag and the seat belt pretensioner. A mechanical sensor part 17 includes a switch turning on when detecting acceleration greater than a predetermined value and in a predetermined direction, and it operates by smaller acceleration than that one relative to the electronic acceleration sensor part 11. Accordingly, when the mechanical sensor part 17 is operated, current passes from the output part 15 to the ground via the interior system operation part 3 and a power supply line 108, igniting the gas generator by the squib, thus operating the interior system operation part 3.

However, such known controller for an interior system is not designed in view of reutilization thereof, i.e., it should be changed if the interior system operation part is once operated, resulting in increased cost of the controller.

It is, therefore, an object of the present invention to provide a controller for an interior system for an automotive vehicle which can be used repeatedly.

SUMMARY OF THE INVENTION

According to one aspect of the present invention, there is provided, a controller for an interior system for use in a vehicle, comprising:

an operation means for operating the interior system;
a first determination means for determining whether or not an acceleration applied to the vehicle is greater than a first predetermined value and generating a first acceleration indicative signal when said acceleration is greater than said first predetermined value;
a drive means for driving said operation means in response to said first acceleration indicative signal;
a second determination means for determining whether or not said acceleration is greater than a second predetermined value and generating a second acceleration indicative signal when said acceleration is greater than a second predetermined value; and
a drive inhibition means for inhibiting a subsequent drive of said drive means in response to said second acceleration indicative signal after completion of an operation of said operation means which was driven by said drive means in response to said first acceleration indicative signal.

According to another aspect of the present invention, there is provided a controller for an interior system for use in a vehicle, comprising:

an operation means for operating the interior system;
a first determination means for determining whether or not an acceleration applied to the vehicle is greater than a first predetermined value and generating a first acceleration indicative signal when said acceleration is greater than said first predetermined value;
a drive means for driving said operation means in response to said first acceleration indicative signal;
a third determination means for counting a drive number of said operation means and determining whether or not said drive number of said operation means is greater than a predetermined value and generating a drive number indicative signal when said drive number of said operation means is greater than said predetermined value; and
a drive inhibition means for inhibiting a subsequent drive of said drive means in response to said drive number indicative signal after completion of an operation of said operation means which was driven by said drive means in response to said first acceleration indicative signal.

According to further aspect of the present invention, there is provided a controller for an interior system for use in a vehicle, comprising:

an operation means for operating the interior system;

a first determination means for determining whether or not an acceleration applied to the vehicle is greater than a first predetermined value and generating a first acceleration indicative signal when said acceleration is greater than said first predetermined value;

a drive means for driving said operation means in response to said first acceleration indicative signal;

a second determination means for determining whether or not said acceleration is greater than a second predetermined value and generating a second acceleration indicative signal when said acceleration is greater than a second predetermined value;

a third determination means for counting a drive number of said operation means and determining whether or not said drive number of said operation means is greater than a predetermined value and generating a drive number indicative signal when said drive number of said operation means is greater than said predetermined value; and a drive inhibition means for inhibiting a subsequent drive of said drive means in response to said second acceleration indicative signal and said drive number indicative signal after completion of an operation of said operation means which was driven by said drive means in response to said first acceleration indicative signal.

DETAILED DESCRIPTION OF INVENTION

Figure 1:
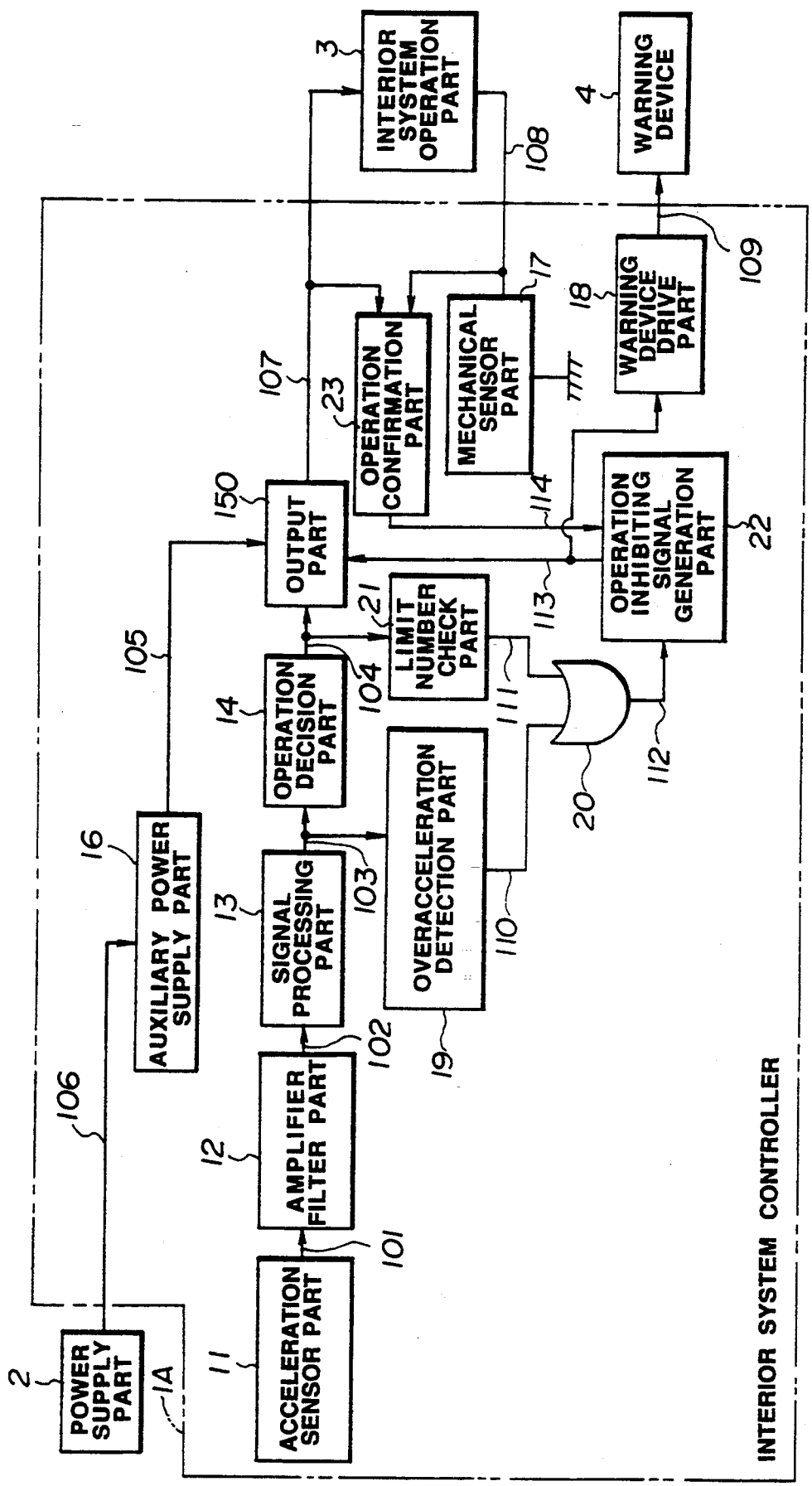
FIG. 1 is a block diagram showing a preferred embodiment of a controller for an interior system for use in an automotive vehicle according to the present invention.

Referring to the drawings, a preferred embodiment of the present invention will be described.

Figure 4:
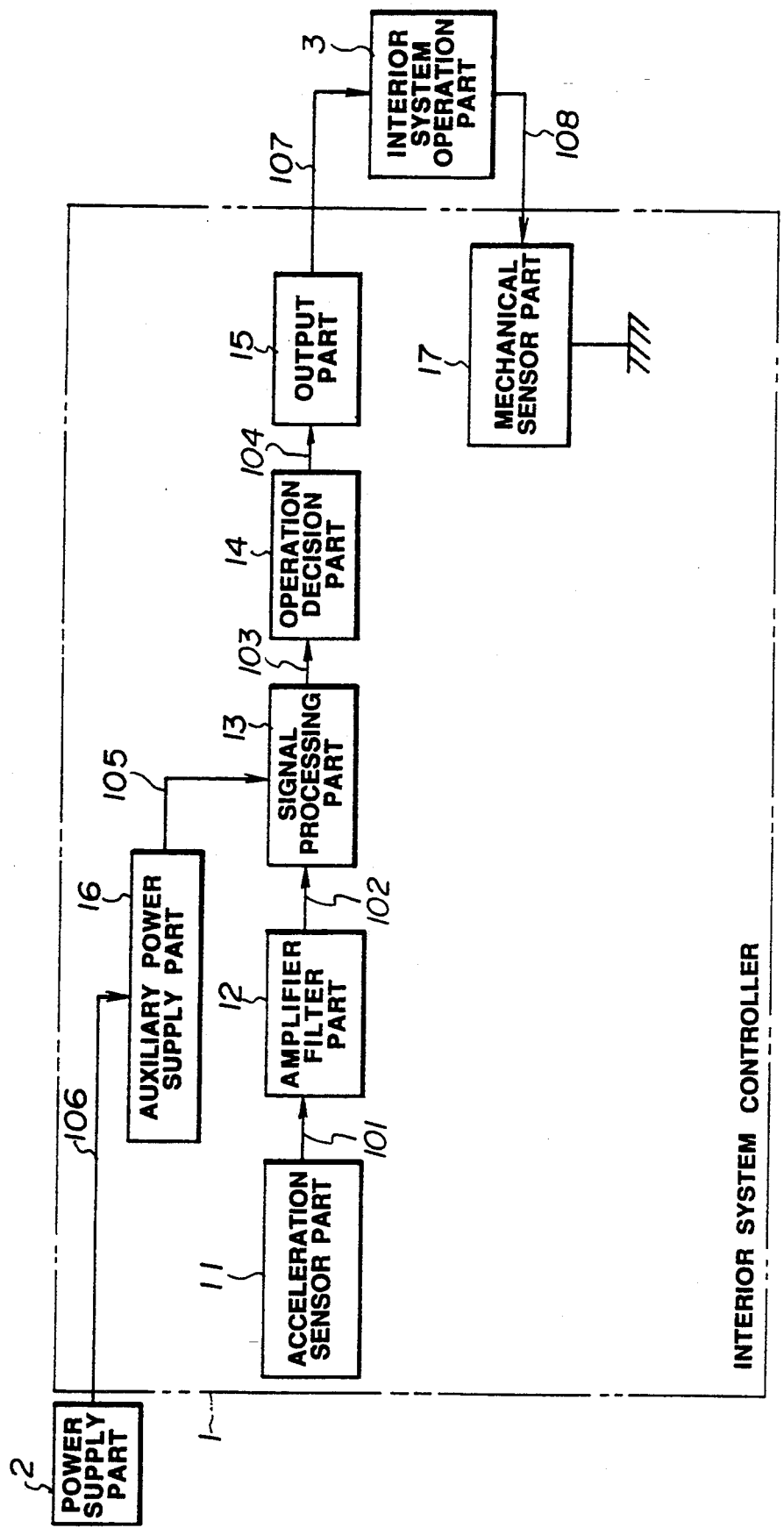
FIG. 4 is a view similar to FIG. 1, showing a known controller for an interior system.

Referring to FIG. 1, wherein like reference numerals correspond to like parts in FIG. 4, 19 designates an overacceleration detection part (second determination means) for detecting overacceleration in response to an acceleration signal 103 from a signal processing part 13. It is to be noted that overacceleration corresponds to a second acceleration as a criterion for a second discrimination means, and is an utmost acceleration wherein internal circuits of a controller for an interior system 1A are capable of ensuring the operation without any breakdown. When detecting overacceleration, the overacceleration detection part 19 outputs an output signal 110 to an OR circuit 20. 21 designates a limit number check part (third determination means) which outputs an output signal 111 to the OR circuit 20 when the output number of an output indicative signal 104 of an operation detection part 14 (first determination means) amounts to a predetermined value. It is to be noted that this predetermined value of the output number corresponds to a predetermined value for a criterion for a third discrimination means, and is set, in view of a lifetime of a condenser 16D of an auxiliary power supply part 16 which repeatedly performs charge and discharge every operation of the interior system controller 1A, and a deterioration of a contact part of a mechanical sensor part 17, to the utmost wherein the above parts are capable of ensuring the operation. When inputting either of the signals 110, 111, the OR circuit 20 outputs an output signal 112 to an operation inhibiting signal generation part (drive inhibition means) 22.

Figure 2:
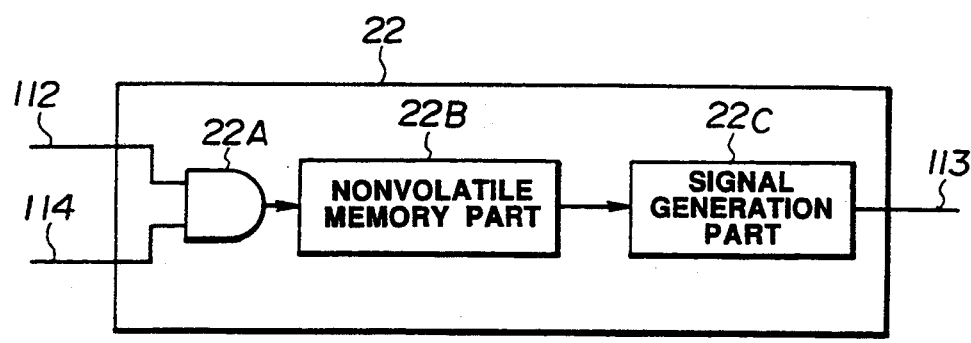
FIG. 2 is a fragmentary block diagram showing an operation inhibiting signal generation part of the controller in FIG. 1.
Figure 3:
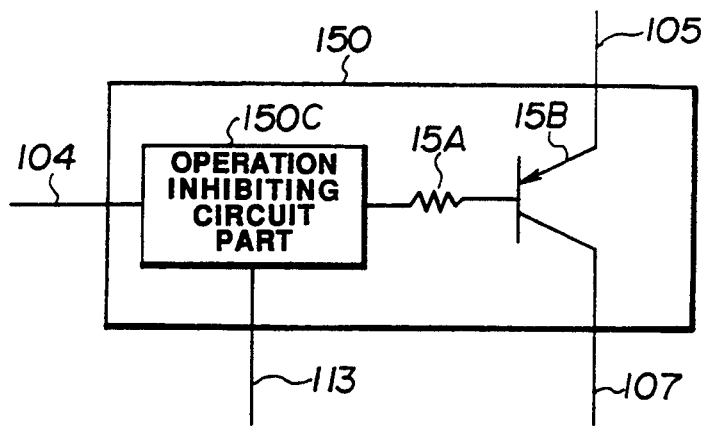
FIG. 3 is a view similar to FIG. 2, showing an output part of the controller in FIG. 1.

23 designates an operation confirmation part (drive inhibition means) which monitors a potential difference between two power supply lines 107, 108 connected to the interior system operation part 3 (operation means) at both ends thereof, respectively. When a potential difference greater than a predetermined value is generated above a predetermined period of time after operation of the interior system operation part 3, the operation confirmation part 23 outputs an operation confirmation signal 114 to the operation inhibiting signal generation part 22. Referring to FIG. 2, the operation inhibiting signal generation part 22 comprises an AND circuit 22A, a nonvolatile memory part 22B, and a signal generation part 22C. When the AND circuit 22A inputs the output signal 112 of the OR circuit 20 and the operation confirmation signal 114 at once, the AND circuit 22A outputs a signal to the nonvolatile memory part 22B, recording establishment of an operation inhibiting condition in the nonvolatile memory part 22B. Additionally, with recording of establishment of the operation inhibiting condition in the nonvolatile memory part 22B, the signal generation part 22C outputs an operation inhibiting signal 113. A record of establishment of the operation inhibiting condition in the nonvolatile memory part 22B is remained even if a power supply of the interior system controller 1A is shut off. With next closing of the power supply, the signal generation part 22C outputs the operation inhibiting signal 113. Referring to FIG. 3, an output part 150 (drive means) is constructed so that an operation inhibiting circuit part 150C is added to the prior art output part 15, and inhibits a transistor 15B, when inputting the operation inhibiting signal 113, from turning on even if the output indicative signal 104 is provided from the operation decision part 14. 18 designates a warning device drive part (warning means) which outputs a warning signal 109 to a warning device (warning means) 4 such as a warning lamp, a buzzer, etc. so as to warn a passenger that the interior system controller 1A is out of usability.

Next, the operation of this embodiment will be described, particularly, with regard to a difference of this embodiment from the prior art as shown in FIG. 4.

Suppose now that the vehicle undergoes acceleration which has to operate the interior system operation part 3. The amplifier filter part 12 amplifies an acceleration signal 101 detected by an acceleration sensor part 11 so as to eliminate a needless frequency. Then, a signal processing part 13 compares the acceleration signal 101 with a predetermined threshold value, and integrates that one greater than the threshold value. This integration signal 103 is provided to the operation decision part 14 and the overacceleration detection part 19. In a manner as described above, the operation decision part 14 detects that the integration signal 103 exceeds a predetermined value corresponding to the aforementioned first acceleration, and outputs the output indicative signal 104 to the output part 150. On the other hand, the overacceleration detection part 19 checks whether or not acceleration applied in response to the integration signal 103 exceeds overacceleration corresponding to the aforementioned second acceleration. When it exceeds overacceleration, the overacceleration detection part 19 outputs the output signal 110 to the OR circuit 20. Additionally, the output indicative signal 104 of the operation decision part 14 is provided to the limit number check part 21 which outputs the output signal 111 to the OR circuit 20 when the output number of the output indicative signal 104 out of an operation detection part 14 exceeds a predetermined value.

On the other hand, in response to the output indicative signal 104 out of the operation decision part 14, the output part 150 applies electric energy charged in the condenser 16D of the auxiliary power supply part 16 to the interior system operation part 3 via the transistor 15B. Since present supposition is such that the vehicle undergoes acceleration which has to operate the interior system operation part 3, the mechanical sensor part 17 is also in operation, with the contact thereof closed. Accordingly, current passes from the condenser 16→power supply line 105→transistor 15B→power supply line 107→interior system operation part 3→power supply part 108→contact part of the mechanical sensor part 17→ground, causing actuation of the interior system operation part 3, thus operating the interior system (not shown). With a current passage, the potential difference is generated in the interior system operation part 3 at both ends thereof. When a potential difference greater than a predetermined value is generated above a predetermined period of time, the operation confirmation part 23 detects operation of the interior system operation part 3, and outputs the operation confirmation signal to the operation inhibiting signal generation part 22.

At that time, when acceleration applied to the vehicle exceeds the threshold value of the overacceleration detection part 19, i.e., overacceleration, or the output indicative signal 104 output from the operation decision part 14 by acceleration currently applied amounts to a predetermined value of the limit number check part 21, or the two are produced at once, the OR circuit 20 outputs the output signal 112 to the operation inhibiting signal generation part 22. When the operation confirmation part 23 outputs the operation confirmation signal 114, and the OR circuit 20 outputs the output signal 112, i.e., when an operation inhibiting condition is established, and a final actuation of the interior system for ensuring the operation is completed, the AND circuit 22A of the operation inhibiting signal generation part 22 outputs a signal to the nonvolatile memory part 22B so as to record establishment of the operation inhibiting condition therein. With this recording of establishment of the operation inhibiting condition, the signal generation part 22C outputs the operation inhibiting signal 113 to the output part 150 and the warning device drive part 18. Thereafter, the operation inhibiting circuit part 150C of the output part 150 inhibits actuation of the interior system operation part 3 even if the operation decision part 14 provides the output indicative signal 104 thereto. At the same time, the warning device drive part 18 drives the warning device 4 to warn to the passenger that the interior system controller 1A is out of usability.

In such a manner, it is detected whether or not acceleration detected is greater than the utmost wherein the internal circuits of the interior system controller 1A are capable of ensuring the operation without any breakdown, and it is detected whether or not the output number of the output indicative signal 104 out of the operation decision part 14 for operating the interior system operation part 3 is greater than the utmost wherein the condenser 16D and the mechanical sensor part 17 are capable of ensuring the operation. When either of the two is detected, and actuation of the interior system operation part 3 is confirmed, a warning is given by the warning device 4, and subsequent operation of the interior system operation part 3 by the output part 150 is inhibited, enabling a repeated use of the interior system controller 1A, resulting in a cost reduction thereof.

Further, once the operation inhibiting condition of the interior system operation part 3 is established, it is recorded in the nonvolatile memory part 22B. Accordingly, even if the power supply is shut off, a record that the interior system controller 1A is out of usability is remained. And, with next closing of the power supply, a warning and operation inhibition of the interior system operation part 3 can surely be performed in accordance with this record.

Figure 5:
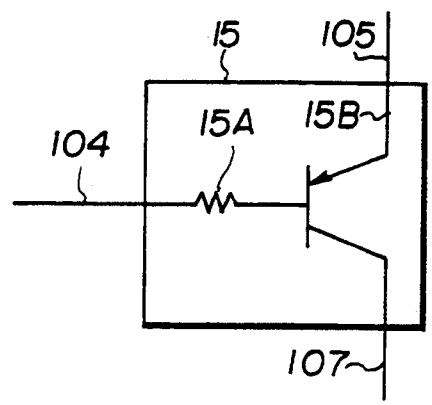
FIG. 5 is a view similar to FIG. 3, showing an output part of the known controller in FIG. 4.
Figure 6:
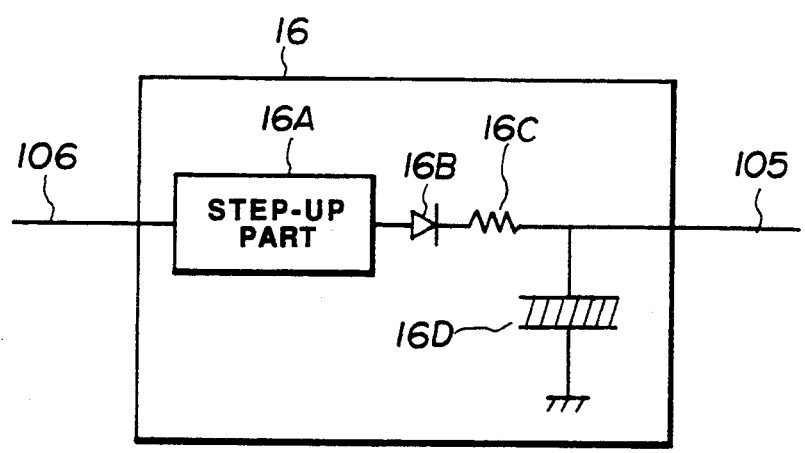
FIG. 6 is a view similar to FIG. 5, showing an auxiliary power supply part of the known controller in FIG. 4.

In the above embodiment, upon establishment of the operation inhibiting condition, the operation inhibiting signal is output to the output part 150 to inhibit subsequent operation of the output part 150. Alternatively, the output part 150 may be identical to the prior art output part 15 as shown in FIGS. 4 and 5, and the operation inhibiting signal may merely be output to the warning device drive part 18 to give just a warning upon establishment of the operation inhibiting condition.

Further, in the above embodiment, when overacceleration is detected by the overacceleration detection part 19, or the operation number checked by the limit number check part 21 exceeds a predetermined value, operation of the output part 150 is inhibited. Alternatively, either of the overacceleration detection part 19 and the limit number check part 21 may be disposed to inhibit operation of the output part 150 in response to a detection of overacceleration or an excess of the operation number over a predetermined value.

Still further, when current passes through the interior system operation part 3, open circuit or short circuit of the squib circuit can be produced before the operation confirmation part 23 confirms the potential difference in a predetermined period of time. Thus, the operation confirmation part 23 may be used to detect simultaneous actuation of the output part 150 and the mechanical sensor part 17 so as to output the operation confirmation signal 114.

Furthermore, in the above embodiment, the first acceleration and the second acceleration or overacceleration are detected in response to the electric signal corresponding to acceleration detected by the acceleration sensor part 11. Alternatively, the first and second accelerations may be detected by respective acceleration sensors, acceleration switches, etc.

What is claimed is:
1. A controller for an interior system for use in a vehicle, comprising:
an operation means for operating the interior system;

a first determination means for determining whether or not an acceleration applied to the vehicle is greater than a first predetermined value and generating a first acceleration indicative signal when said acceleration is greater than said first predetermined value;

a drive means for driving said operation means in response to said first acceleration indicative signal;

a second determination means for determining whether or not said acceleration is greater than a second predetermined value which is greater than said first predetermined value and generating a second acceleration indicative signal when said acceleration is greater than said second predetermined value; and a drive inhibition means for inhibiting a subsequent drive of said drive means in response to said second acceleration indicative signal after completion of an operation of said operation means which was driven by said drive means in response to said first acceleration indicative signal.

2. A controller as claimed in claim 1, wherein said drive inhibition means includes a nonvolatile memory for recording establishment of a subsequent drive inhibiting condition of said drive means.

3. A controller as claimed in claim 1, further comprising:

a warning means for giving a warning when said drive inhibition means inhibits said subsequent drive of said drive means.

4. A controller as claimed in claim 1, wherein each of said first and second determination means includes a respective electronic acceleration sensor.

5. A controller for an interior system for use in a vehicle, comprising:

an operation means for operating the interior system;

a first determination means for determining whether or not an acceleration applied to the vehicle is greater than a first predetermined value and generating a first acceleration indicative signal when said acceleration is greater than said first predetermined value;

a drive means for driving said operation means in response to said first acceleration indicative signal;

a second determination means for counting a number of operations of said operation means and determining whether or not said number of operations of said operation means is greater than a predetermined value and generating a number indicative signal when said number of operations of said operation means is greater than said predetermined value; and a drive inhibition means for inhibiting a subsequent drive of said drive means in response to said number indicative signal after completion of an operation of said operation means which was driven by said drive means in response to said first acceleration indicative signal.

6. A controller for an interior system for use in a vehicle, comprising:

an operation means for operating the interior system;

a first determination means for determining whether or not an acceleration applied to the vehicle is greater than a first predetermined value and generating a first acceleration indicative signal when said acceleration is greater than said first predetermined value;

a drive means for driving said operation means in response to said first acceleration indicative signal;

a second determination means for determining whether or not said acceleration is greater than a second predetermined value which is greater than said first predetermined value and generating a second acceleration indicative signal when said acceleration is greater than said second predetermined value;

a third determination means for counting a number of operations of said operation means and determining whether or not said number of operations of said operation means is greater than a predetermined value and generating a number indicative signal when said number of operations of said operation means is greater than said predetermined value; and a drive inhibition means for inhibiting a subsequent drive of said drive means in response to said second acceleration indicative signal and said number indicative signal after completion of an operation of said operation means which was driven by said drive means in response to said first acceleration indicative signal.

* * * * *